United States Patent
Yun et al.

(10) Patent No.: US 12,362,438 B2
(45) Date of Patent: *Jul. 15, 2025

(54) BATTERY ASSEMBLY CAPABLE OF SIMULTANEOUS APPLICATION OF MECHANICAL PRESSING AND MAGNETIC PRESSING TO BATTERY CELL

(71) Applicant: LG ENERGY SOLUTION, LTD., Seoul (KR)

(72) Inventors: Hyunwoong Yun, Daejeon (KR); Hoejin Hah, Daejeon (KR); Jong Keon Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 459 days.

This patent is subject to a terminal disclaimer.

(21) Appl. No.: 16/968,094

(22) PCT Filed: Dec. 19, 2019

(86) PCT No.: PCT/KR2019/018123
§ 371 (c)(1),
(2) Date: Aug. 6, 2020

(87) PCT Pub. No.: WO2020/159082
PCT Pub. Date: Aug. 6, 2020

(65) Prior Publication Data
US 2021/0028421 A1 Jan. 28, 2021

(30) Foreign Application Priority Data
Feb. 1, 2019 (KR) .................... 10-2019-0014017

(51) Int. Cl.
*H01M 50/531* (2021.01)
*H01M 10/04* (2006.01)
(Continued)

(52) U.S. Cl.
CPC ..... *H01M 50/531* (2021.01); *H01M 10/0481* (2013.01); *H01M 10/0525* (2013.01); *H01M 50/213* (2021.01)

(58) Field of Classification Search
CPC .............. H01M 50/20; H01M 50/531; H01M 10/0481; H01M 10/0525
See application file for complete search history.

(56) References Cited

U.S. PATENT DOCUMENTS 6,432,586 B1 8/2002 Zhang
9,694,449 B2 7/2017 Hwang
(Continued)

FOREIGN PATENT DOCUMENTS

CN 2919968 Y * 7/2007
CN 101304099 A 11/2008
(Continued)

OTHER PUBLICATIONS

English translation of CN-2919968-Y. Chen et al. (Year: 2007).*
(Continued)

*Primary Examiner* — Jonathan G Leong
*Assistant Examiner* — Drew C Newman
(74) *Attorney, Agent, or Firm* — Morgan, Lewis & Bockius LLP

(57) ABSTRACT

The present invention discloses a pressing jig for pressing a battery cell, and a battery module, wherein the pressing jig includes a plurality of pressing plates provided on outermost portions of a plurality of battery cells and separating a space for receiving a plurality of battery cells, and performing pressing on a plurality of battery cells, wherein the pressing plates excluding one pressing plate provided on an outermost portion on one side may move in a horizontal direction as the pressing direction, while connected to the pressing frames, and a magnet is included on one pair of pressing
(Continued)

plates provided on outermost portions on respective sides of the pressing plates so that opposite polarities may face each other, and a shielding film is formed on a portion exposed to an outside on the sides excluding an inside that faces battery cells on the one pair of pressing plates.

2 Claims, 7 Drawing Sheets

(51) Int. Cl.
*H01M 10/0525* (2010.01)
*H01M 50/213* (2021.01)

(56) References Cited

U.S. PATENT DOCUMENTS

| | | | |
|---|---|---|---|
| 2007/0015047 A1 | 1/2007 | Hosaka et al. | |
| 2010/0190049 A1 | 7/2010 | Kawase et al. | |
| 2011/0014942 A1* | 1/2011 | Van Schyndel | H01M 50/00 429/163 |
| 2011/0023290 A1 | 2/2011 | Shinyashiki et al. | |
| 2012/0288741 A1 | 11/2012 | Gutsch et al. | |
| 2016/0380299 A1 | 12/2016 | Umeyama et al. | |
| 2017/0204519 A1* | 7/2017 | Kwag | C25D 7/00 |
| 2018/0301676 A1 | 10/2018 | Kim et al. | |
| 2019/0058183 A1 | 2/2019 | Lee et al. | |
| 2019/0252715 A1 | 8/2019 | Kawase et al. | |
| 2023/0066229 A1* | 3/2023 | Ha | H01M 50/211 |

FOREIGN PATENT DOCUMENTS

| | | | | |
|---|---|---|---|---|
| CN | 101315973 A | | 12/2008 | |
| CN | 102576834 A | | 7/2012 | |
| EP | 3133670 A1 | * | 2/2017 | B29C 64/386 |
| JP | 2004-59320 A | | 2/2004 | |
| JP | 2005-116431 A | | 4/2005 | |
| JP | 2006-147534 A | | 6/2006 | |
| JP | 2007-26734 A | | 2/2007 | |
| JP | 2009-026703 A | | 2/2009 | |
| JP | 4791612 B2 | * | 10/2011 | F16F 3/023 |
| JP | 2012-003952 A | | 1/2012 | |
| JP | 2013-055017 A | | 3/2013 | |
| JP | 2015-087372 A | | 5/2015 | |
| JP | 2017-10878 A | | 1/2017 | |
| JP | 2017054681 A | * | 3/2017 | |
| JP | 2017-188282 A | | 10/2017 | |
| JP | 2017-195018 A | | 10/2017 | |
| JP | 2018-532239 A | | 11/2018 | |
| KR | 10-1181303 B1 | | 9/2012 | |
| KR | 10-2013-0079738 A | | 7/2013 | |
| KR | 10-2015-0050220 A | | 5/2015 | |
| KR | 10-2015-0082957 A | | 7/2015 | |
| KR | 10-2016-0059493 A | | 5/2016 | |
| KR | 10-2016-0107704 A | | 9/2016 | |
| KR | 20150050220 A | * | 5/2017 | H01M 50/209 |
| KR | 10-2017-0068145 A | | 6/2017 | |
| KR | 10-2017-0094042 A | | 8/2017 | |
| KR | 10-2018-0012567 A | | 2/2018 | |
| KR | 20180012567 A | * | 2/2018 | H01M 10/049 |
| WO | WO-2014140472 A1 | * | 9/2014 | B60R 16/03 |

OTHER PUBLICATIONS

English translation of JP-4791612-B2. Januma et al. (Year: 2011).*
English translation of Fujimoto et al. (JP-2017054681-A). (Year: 2017).*
English translation of Hosaka et al. (JP-2006147534-A). (Year: 2006).*
Extended European Search Report issued by the European Patent Office dated May 3, 2021 in a corresponding European Patent Application No. 19909624.9.
International Search Report and Written Opinion issued in corresponding International Patent Application No. PCT/KR2019/018123, dated Apr. 13, 2020.
Office Action issued Jul. 27, 2023, by the Chinese Patent Office in corresponding to Chinese Patent Application No. 201980007423.7.

* cited by examiner

BATTERY ASSEMBLY CAPABLE OF SIMULTANEOUS APPLICATION OF MECHANICAL PRESSING AND MAGNETIC PRESSING TO BATTERY CELL

TECHNICAL FIELD

The present invention relates to a battery assembly including a battery cell for concurrently applying mechanical pressing and magnetic pressing.

BACKGROUND ART

In general, a battery signifies a device including an electrochemical cell for supplying a potential between at least one set of terminals and a set of cells. The terminals of the battery may be electrically connected to, for example, a DC load and may supply energy that is a voltage to the load. The battery includes a dry cell, a wet cell (e.g., a lead-acid cell), and a device for converting a chemically-usable electromotive force into a current.

From among the batteries, a secondary battery is made of an electrode assembly made of a three-layered structure of a positive electrode plate/separator/negative electrode plate or a multi-layered structure of at least five layers of a positive electrode plate/separator/negative electrode plate/separator/positive electrode plate, and putting the electrode assembly into a pouch, and the secondary battery is also referred to as a pouch-type secondary battery.

Characteristics of the secondary battery include that it may be recharged after use, and although its capacity is limited, it may be repeatedly used by reversely performing a discharging process to a certain degree. In other words, differing from a primary battery that cannot be charged, the secondary battery may be charged and discharged, and it is widely used in current electronic device fields such as with cellular phones, laptop computers, and camcorders. Particularly, compared to other secondary batteries such as existing lead batteries, nickel-cadmium batteries, nickel-hydrogen batteries, and nickel-zinc batteries, a lithium secondary battery has high energy density per unit weight and allows fast charging, so an increase of use thereof is actively occurring.

A lithium-based oxide is used as a positive active material of the lithium rechargeable battery, and a carbonaceous material is used as a negative active material. A predetermined area of the electrode assembly is manufactured by stacking a positive electrode plate in which a positive electrode tab is installed in a positive current collector on which a positive active material is formed, a negative electrode plate in which a negative electrode tab is installed in a negative electrode current collector on which negative electrode active material is formed, and a separator provided between the positive electrode plate and the negative electrode plate by use of the active material, and an electrolyte solution is injected into a pouch through a one-side opening of the pouch after receiving the electrode assembly in the pouch, the opening is sealed, and the manufacturing of a pouch-type battery cell is completed by performing an activation process including charging and discharging and an aging process and a process for removing part of the pouch side where gas is collected in a degassing process.

On the other hand, when the electrolyte solution is filled in the pouch of the pouch-type battery cell, respective portions of the pouch bulge to the outside, so the respective portions of the pouch of the battery cell need to be pressed so as to increase the capacity of the battery. In other words, the capacity of the battery may increase when the electrolyte solution filled in the pouch of the battery cell is uniformly spread, so the battery cell needs to be pressed so that the electrolyte solution may be uniformly spread.

In addition, gaps of respective constituent elements of the electrode assembly in the battery cell are compactly attached to each other to the maximum by the pressurization so that the energy density of the battery may increase, and it is possible to suppress generation of gas and the growth of lithium dendrites generated in the charging and discharging process, and the lifespan performance becomes excellent. This is particularly pronounced in the lithium metal battery using the lithium metal as a negative electrode active material.

On the other hand, a process for pressing a battery cell during the manufacturing process is performed by using a pressing jig, but the pressing during the operation of the battery cell had to be performed in a limited way by a battery module case in which the battery cell is installed. Accordingly, there were limits in substantial improvements on generation of gas and a growth of lithium dendrites generated during the operation of the battery cell.

Therefore, methods for generating further excellent performance are highly needed by pressing the battery cells while they are operated, and increasing the pressing force.

DISCLOSURE

An object of the present invention is to solve the problems of the prior art and technical problems from the past.

The present invention has been made in an effort to further increase a pressing force added to battery cells by providing a battery assembly for applying mechanical pressing and magnetic pressing by a magnet to battery cells, and to improve battery performance by providing a uniform pressing force.

Further, the present invention has been made in an effort to increase processing efficiency as the battery assembly may become a battery module so no additional battery module is needed to be manufactured.

Therefore, the present invention discloses a battery assembly for pressing a battery cell, including: a plurality of battery cells; a presser including a plurality of pressing plates provided on outermost portions of a plurality of battery cells, and among them, separating a space in which a plurality of battery cells are installed, and performing pressing on a plurality of battery cells, and pressing frames for connecting the pressing plates on an upper portion and a lower portion of the plurality of pressing plates; and a driver for moving the presser so as to press a plurality of battery cells to the pressing plates, wherein all the pressing plates or the pressing plates excluding one pressing plate provided on one outermost portion are movable in a horizontal direction to a pressing direction while connected to the pressing frames, and a magnet is included on one pair of pressing plates provided on outermost portions on respective sides of the pressing plates so that opposite polarities may face each other, and a shielding film is formed on a portion exposed to an outside on the sides excluding an inside that faces battery cells on the one pair of pressing plates.

The present invention will be described in detail for better understanding of the present invention.

Terms or words used in the present specification and claims, which will be described below, should not be interpreted as being limited to typical or dictionary meanings, but should be interpreted as having meanings and concepts which comply with the technical spirit of the present invention, based on the principle that an inventor can appropriately define the concept of the terms to describe his/her own invention in the best manner.

The terminology used herein is for the purpose of describing particular embodiments only and is not intended to be limiting of the invention. Singular forms are intended to include plural forms as well, unless the context clearly indicates otherwise.

It will be further understood that the terms "include," "have," or "possess" specify the presence of stated features, steps, components, or combinations thereof, but do not preclude the presence or addition of one or more other features, steps, components, or combinations thereof.

The battery cell may have a thin plate shape, but its type is not limited thereto, and in detail, it may be a pouch-type battery cell including a plurality of external transformations during an operation of the battery and requiring steady pressing.

According to the present invention, a presser supports a plurality of battery cells and simultaneously presses the same.

By the above-noted structure, according to the present invention, the volume of the battery assembly may be minimized while mechanical pressing is performed on a plurality of battery cells.

Differing from this, when a support member is included in addition to pressing plates, the volume increases by an amount thereof, which is undesirable.

Therefore, regarding the presser, the pressing plates must exist on the outermost side so that, while separating a space in which battery cells are installed, the battery cells may not be exposed to the outside, and a number of a plurality of pressing plates is always greater than a number of a plurality of battery cells by one.

Further, to perform the function, at least some of the pressing plates must be able to move, and in this instance, movable ones from among the pressing plates may be determined depending on a position of a driver for moving the presser.

For example, when the driver is formed to be provided on respective sides so as to press one pair of pressing plates provided on the outermost portion from the respective sides in the facing-each-other direction, the pressing plates may be able to move in a horizontal direction as the pressing direction.

On the contrary, when the driver is formed to be provided on one side so that it may press the battery cells in one direction, the pressing plate provided on the outermost portion on one side must be fixed so that a pressing force may be transmitted. Therefore, in this case, all the pressing plates are moveable, and the pressing plate provided on the outermost on one side may be randomly fixed, while the pressing plate provided on the outermost portion on one side may be immovable.

Therefore, regarding the battery assembly according to the present invention, all the pressing plates, or the pressing plates excluding one pressing plate provided on the outermost portion on one side, may be movable.

Further, the pressing plates may have a plate shape that is not curved and that corresponds to the shape of battery cells so as to apply a uniform pressing force to the battery cells, and they may be formed with a material with predetermined rigidity and predetermined thickness.

The presser may receive a plurality of battery cells, and it further includes pressing frames for supporting and connecting the pressing plates. The pressing frame may connect the pressing plates on an upper side and a lower side of a plurality of pressing plates so as to secure the pressing plates.

Therefore, the pressing frames according to the present invention may include an upper pressing frame provided in a direction in which electrode terminals of battery cells protrude, and a lower pressing frame provided in parallel to the upper pressing frame and provided in a direction that is opposite the direction in which the electrode terminal protrudes.

As the pressing plates include the upper base frame and the lower base frame as described above, they may receive a force from the driver.

Here, regarding the terms upper and lower, the direction in which the electrode terminals protrude with respect to the electrode terminals protruding direction is referred to as upper, and the direction opposite to the direction in which the electrode terminals protrude is referred to as lower.

The shapes of the upper pressing frame and the lower pressing frame are not limited as long as they have a configuration of connecting the pressing plates, but the upper pressing frame is provided in the direction in which the electrode terminals protrude, so it is preferable for the portions on which the electrode terminals are provided to have an opened form so as to fluently electrically connect the electrode terminals.

Therefore, the upper pressing frame may have a shape of at least two bars in parallel to each other, and electrode terminals of the battery cells may be exposed between the bars.

On the contrary, the lower pressing frame must form a space for installing the battery cells together with pressing plates, so it may be formed to have one plate shape so that the battery cells may be stably mounted.

As described above, according to the present invention, the battery assembly has a compact structure, and the battery cells must be pressed between one pair of pressing plates provided on the outermost portions on respective sides, so the pressing plates must be able to move in the horizontal direction as the pressing direction while connected to the pressing frames.

Therefore, a specific member or a device for allowing the pressing plates to be moveable may be formed on the pressing frames, and for example, a structure such as rails may be formed, but any configurations for moving and fixing the pressing plates are allowable.

Any drivers having the structure for moving the presser are usable. For example, the driver may be provided on one side or respective sides, it may be connected to the pressing plate provided on the outermost portion on one side or respective sides, and its form is a pressing plate or a pressing pole, but it is not limited thereto.

As described above, when the driver is formed on one side, the outermost pressing plate that is opposite to the direction in which the driver is formed must be fixed, and when the driver is formed on respective sides, all the pressing plates may be moveable.

According to the present invention, the battery assembly includes a magnet in a form in which opposite polarities face each other, so it simultaneously allows mechanical pressing caused by a movement of the presser by the driver on the battery cell and pressing of the battery cells by magnetism of magnets with different polarities.

In detail, according to the present invention, magnets in the form in which opposite polarities face each other may be included in one pair of pressing plates provided on the outermost portions on the respective sides from among the pressing plates.

Further, magnets may be included on all the pressing plates in the form in which the opposite polarities face each other.

That is, they may be included on the outermost portion on the respective sides or may be included in all the pressing plates, and in this instance, the magnets may be included in the form in which the opposite polarities face each other.

Here, the form of facing each other represents that when a magnet is included on one side in the form of N/S, another one is included on another side in the form of N/S, so the S on one side and the N on another side face each other.

Therefore, attraction caused by the magnets with the opposite polarities may be applied to a plurality of battery cells installed between the pressing plates including the magnet, so pressurization by magnetism may be simultaneously performed.

Inventors of the present application have found that when the magnetic pressing is simultaneously performed in addition to the mechanical pressing, the pressing force on the battery cells may be increased, so further excellent performance of the battery is output by concrete combination of constituent elements forming the electrode, and suppressing of generation of gas and growth of lithium dendrites.

In this instance, the form of including magnets is not limited, and for example, whole or a part of the pressing plates may be formed with magnets, and the magnets may be attached to the inside or the respective sides of the pressing plates facing the battery cells. In detail, the magnets may be attached to the inside of the pressing plates provided on the outermost portion, and may be attached to the respective sides of the pressing plates provided on the middle position.

In this instance, the magnet-including area is not limited, but so as to eliminate deviation of the pressing force inside the battery cell when applying the pressing force to the battery cell, it is desirable for the magnet-including area to be equivalent to or greater than an area of the battery cell to be installed.

Regarding the above-noted configuration, the magnetic pressing force may be determined by the gauss of the magnets with different polarities included in the pressing plates.

When the magnets are included as described above, the magnetic pressing force is generated, but magnetic pressing is simultaneously performed with the mechanical pressing, and hence, in order to maximize an additional applying effect of the magnetic pressing force, it is preferable for the gauss to be equal to or greater than at least 2000, or it is more preferable for the gauss to be equal to or greater than 3000. It is preferable for the gauss to be equal to or less than 7000, equal to or less than 6000, or equal to or less than 5000, and this is because the gauss range of the magnet to be manufactured by the current skill is 7000 gauss to the maximum and it is 5000 gauss in an easy way.

In addition, the battery cell included in the battery assembly according to the present invention is not limited, and for example, it may include a lithium ion battery, a lithium polymer battery, a lithium ion polymer battery, a lithium metal ion battery, and a lithium free ion battery, but a change of volume according to charging and discharging of the battery cell is big, and growth of lithium dendrites is a problem, so it may be a lithium ion battery for applying Si and/or Sn to the negative electrode, a lithium polymer battery, a lithium ion polymer battery, or a lithium metal ion battery using a lithium metal as a negative electrode active material, or a lithium free ion battery for configuring the negative electrode with a negative electrode current collector without a negative electrode active material for solving the problem by strongly pressing the battery cells through a mechanical pressing force by a presser and additional pressing through the magnet, and in further detail, it may be a lithium metal ion battery.

The battery assembly according to the present invention includes a magnet inside the same, and further includes a shielding film so as to minimize an influence of the magnet to the assembled device.

Therefore, the shielding film formed to shield magnetism of the magnet included in the battery assembly is formed on the pressing plates disposed on the outermost portions on respective sides in a like manner of the magnet.

In addition, regarding formation of the position, for the function of shielding the magnet, a shielding film is formed on a portion exposed to the outside, on the sides excluding the inside facing the battery cells.

Further, when magnets are included in all the pressing plates in a form that opposite polarities face each other, a shielding film is formed on the portion exposed to the outside on the other sides excluding the sides that face the battery cells on the pressing plates. That is, the shielding film may be formed on an upper portion of the pressing plates on a middle position.

The shape of the shielding film is not limited, and it is preferable for the shielding film to have a light fiber form so as to minimize an increase of the weight of the entire module case.

In detail, the shielding film is not limited as long as it is made of a material having a shielding function, and for example, it may have a form of mixing Fe, Fe—Si, Cu, permalloy-based, permendur-based, mu-based, moly-permalloy-based, MnZn ferrite-based, NiZn ferrite-based, CuZn ferrite-based, or garnet-based material that are superconductor materials with a material such as a polymer fiber, a rubber, cement, lime, wood, cloth, or paper, or it may have a configuration in which a Cu superconductor material is partly or totally coated on the polymer fiber made of a polyester-based material by electroless plating.

By including the shielding film as described above, the battery assembly according to the present invention may apply mechanical pressing and magnetic pressing during the process for operating the battery cells, thereby minimizing the drawbacks such as the above-described generation of gas, expansion of volume, or growth of lithium dendrites, and also minimizing the drawback that it may influence other parts by the shielding film.

The battery assembly may be a battery module, and in this instance, the presser and the driver may become a module case receiving a plurality of battery cells.

On the other hand, other configurations needed for the battery module, for example, a detailed configuration of an outer terminal, may include items known to a person skilled in the art.

MODE FOR INVENTION

Hereinafter, the present invention will be described with reference to drawings according to an exemplary embodiment of the present invention, and a scope of the present invention is not limited thereto.

Figure 1:
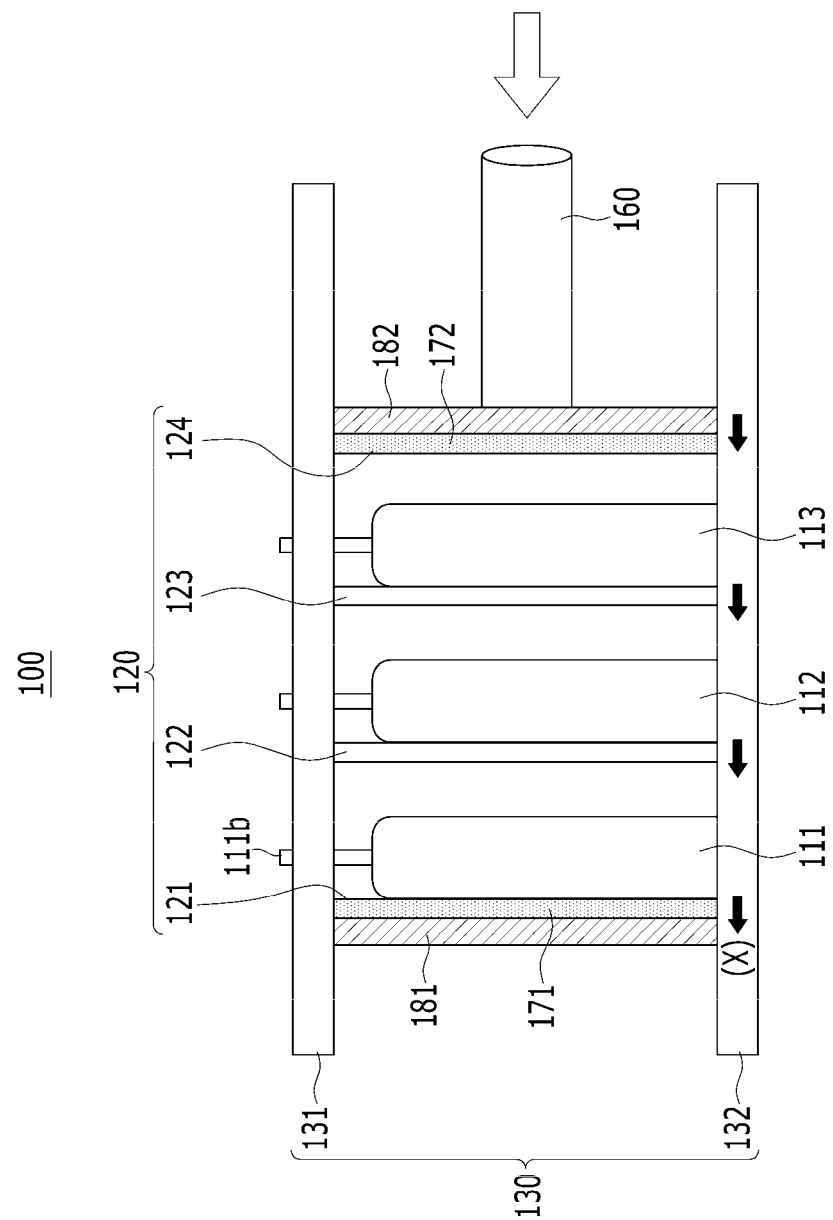
FIG. 1 shows a top plan view of a battery assembly before battery cells according to an exemplary embodiment of the present invention are pressed.
Figure 2:
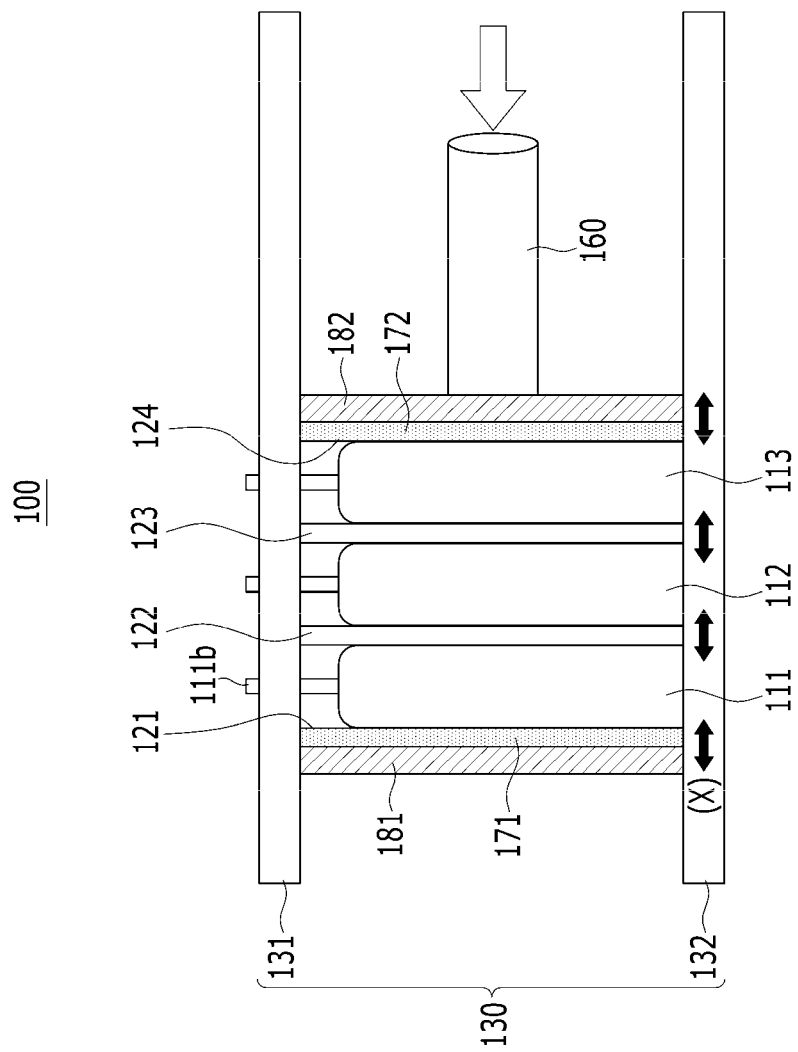
FIG. 2 shows a top plan view of a battery assembly showing that battery cells of a battery assembly of FIG. 1 are pressed.
Figure 3:
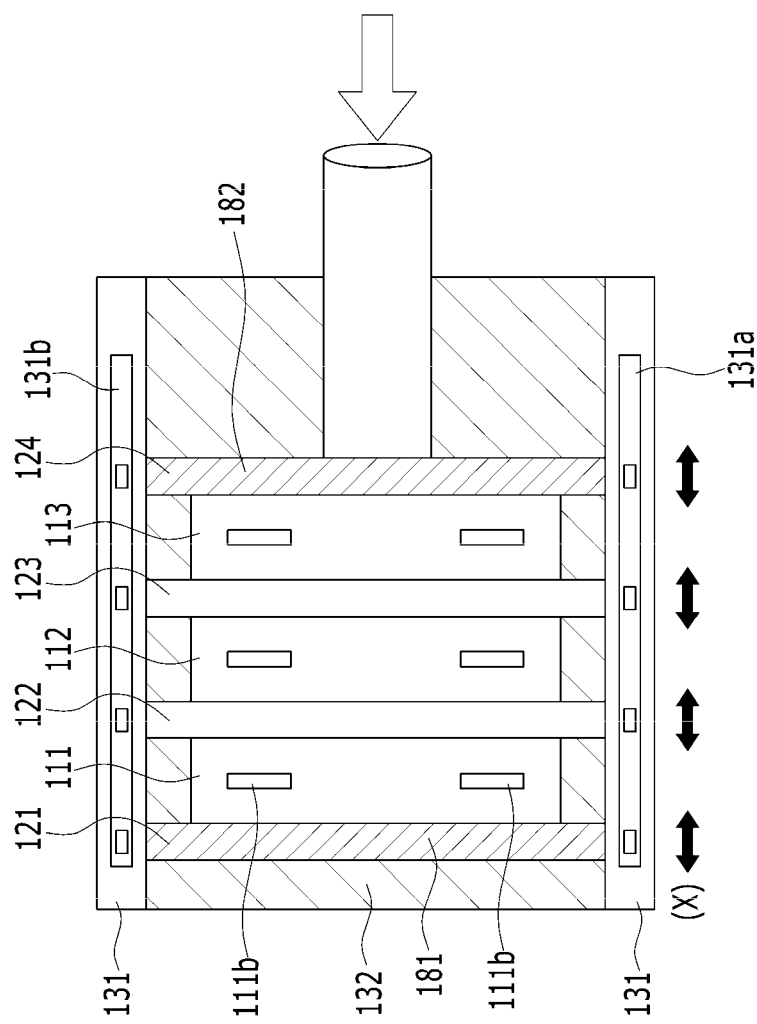
FIG. 3 shows a top view of a battery assembly of FIG. 2.

FIG. 1 shows a top plan view of a battery assembly before battery cells according to an exemplary embodiment of the present invention are pressed, FIG. 2 shows a top plan view of a battery assembly showing that battery cells are pressed, and FIG. 3 shows a top view of the battery assembly.

Referring to FIG. 1 to FIG. 3, the battery assembly 100 includes: a plurality of battery cells 111, 112, and 113; a presser including a plurality of pressing plates (120: 121, 122, 123, and 124) provided on outermost portions of a plurality of battery cells 111, 112, and 113, and among them, separating a space in which a plurality of battery cells 111, 112, and 113 are installed, and pressing them, and pressing frames (130: 131 and 132) for connecting the pressing plates (121, 122, 123, and 124) to each other on an upper side and a lower side; and a driver 160 for substantially moving the presser so as to press the battery cells 111, 112, and 113 with the pressing plates (121, 122, 123, and 124).

This will now be described in detail.

The pressing frames (130: 131 and 132) may house the battery cells 111, 112, and 113, and may support and connect the pressing plates (121, 122, 123, and 124).

In this instance, the pressing frame 130 has a configuration connecting pressing plates (121, 122, 123, and 124) on the upper portions and the lower portions of the pressing plates (121, 122, 123, and 124) so as to make a plurality of pressing plates (121, 122, 123, and 124) firm, and it includes an upper pressing frame 131 and a lower pressing frame 132, so the pressing plates may allow the driver to receive a force.

The upper pressing frame 131 is provided in a direction in which electrode terminals 111b of the battery cells 111, 112, and 113 protrude, and hence, as shown in FIG. 3, it includes at least two bars so that portions on which the electrode terminals 111b are provided may have opened forms, and the electrode terminals 111b of the battery cells 111, 112, and 113 are exposed among the bars. Although not shown in the drawing, the electrode terminals 111b exposed as described above are respectively connected with one lead on the upper side so that they may match their polarities. That is, the negative electrode terminals are connected to each other with one lead, and the positive terminals are connected to each other with one lead.

On the other hand, the lower pressing frame 132 has a plate shape since it has to form a space for receiving the battery cells 111, 112, and 113 together with the pressing plates (121, 122, 123, and 124).

In another way, according to the present invention, the battery assembly 100 has a compact configuration, and presses the battery cells 111, 112, and 113 between one pair of pressing plates 121 and 124 provided on respective outermost sides, and it includes a driver 160 on one side, so it allows one pressing plate 121 provided on one outermost side to be fixed and the other pressing plates 122, 123, and 124 to be moveable in the pressing direction as the horizontal direction (marked with arrows) while connected to the pressing frames. Therefore, as shown in FIG. 1, when the battery cells 111, 112, and 113 are installed on respective positions, and mechanical pressing is performed in the arrow direction by the driver 160, the pressing plates 122, 123, and 124 excluding the outermost pressing plate 121 on one side move in the direction of the outermost pressing plate 121 on one side, and as shown in FIG. 2, the battery cells 111, 112, and 113 become a pressed and compact battery assembly 100.

As described, to move or fix the pressing plates (121, 122, 123, and 124), devices 131a and 131b, such as rails, for moving or fixing the pressing plates (121, 122, 123, and 124) are formed in the pressing frames (130: 131 and 132).

The pressing plates (121, 122, 123, and 124) have a plate shape that is not curved and corresponds to the shape of the battery cells so as to apply uniform pressurization to the battery cells 111, 112, and 113, and they are made of a material with constant rigidity and have a predetermined thickness.

The driver 160 may move the above-noted presser, it is connected to the pressing plate 124 provided to the outermost part on another side, and it has a pressing pole shape. The driver 160 moves the pressing plates (121, 122, 123, and 124).

In another way, the battery assembly 100 according to the present invention includes magnets 171 and 172 so that opposite polarities may face each other on a pair of pressing plates 121 and 124 provided on respective outermost parts from among a plurality of pressing plates (121, 122, 123, and 124). In detail, both or one of the one pair of pressing plates 121 and 124 provided on the outermost part may be made of magnets 171 and 172. In this instance, the magnets 171 and 172 are bigger than the battery cells 111 and 113 facing the same.

In this configuration, attraction caused by the magnets 171 and 172 is applied to a plurality of battery cells 111, 112, and 113 installed between the pressing plates 121 and 124 provided to the outermost part, so magnetic pressing in addition to the mechanical pressurization caused by the movement of the driver 160 may be simultaneously performed.

Further, the battery assembly 100 also includes shielding films 181 and 182 with a magnetic shielding function on the pressing plates 121 and 124 provided on the outermost portion with respect to the pressing direction and the horizontal direction of the battery cells 111, 112, and 113 so as to shield magnetism of the magnets 171 and 172.

In this instance, the shielding films 181 and 182 are formed on the remaining sides excluding the inside that faces the battery cells 111 and 113. Therefore, the outermost pressing plates 121 and 124 are covered by the shielding films 181 and 182 when seen from the top side as shown in FIG. 3.

The shielding films 181 and 182 have a configuration in which a superconductor material is partly or totally coated on a polymer fiber made of a polyester-based material.

Therefore, the battery assembly 100 maintains mechanical pressing and magnetic pressing to the battery cells 111, 112, and 113 while the battery is operated, so effects such as suppressing of lithium dendrites may be maintained, thereby increasing lifespan performance of the battery cells 111, 112, and 113, including the shielding films 181 and 182 with a shielding function so that other components may not be influenced by the magnets 171 and 172, and accordingly acquiring safety.

Figure 4:
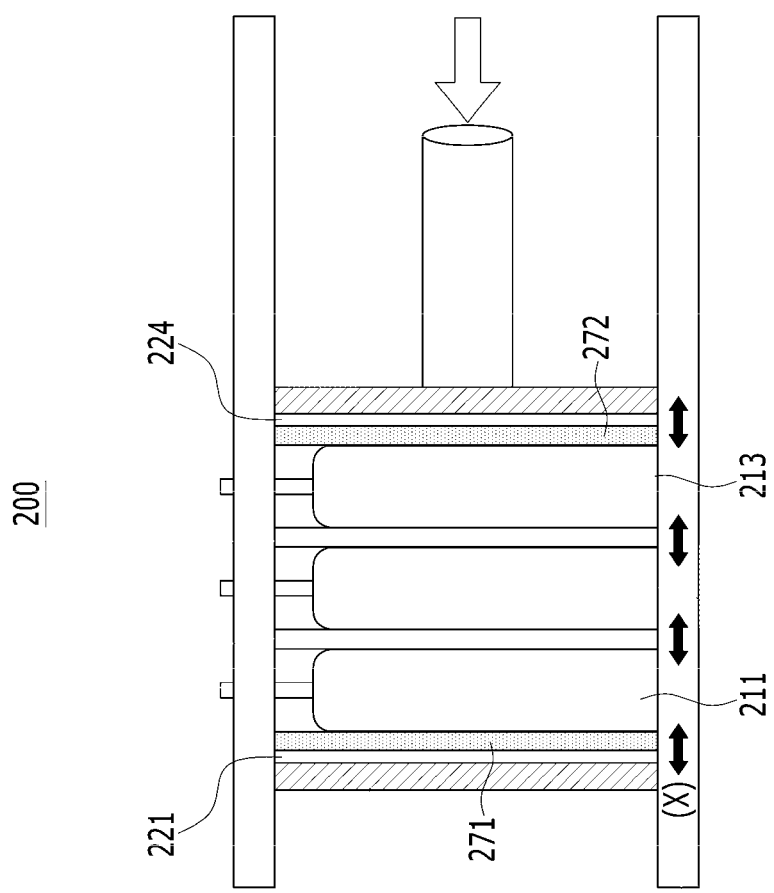
FIG. 4 shows a top plan view of a battery assembly according to another exemplary embodiment of the present invention.
Figure 5:
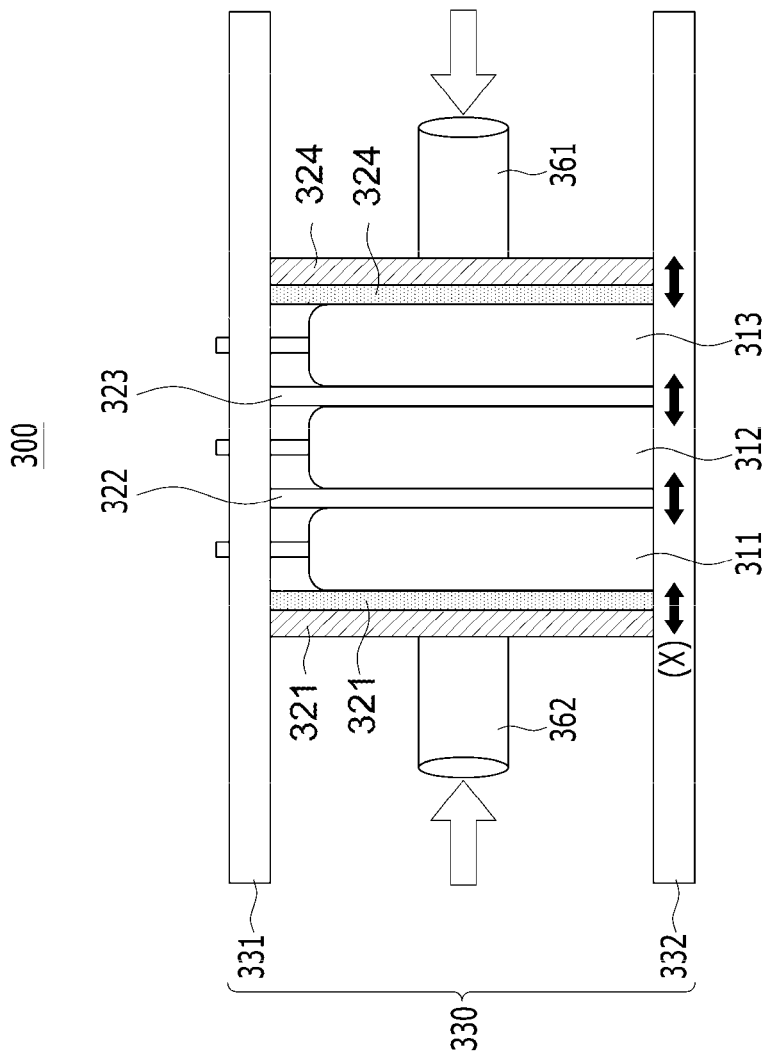
FIG. 5 shows a top plan view of a battery assembly according to another exemplary embodiment of the present invention.

FIG. 4 and FIG. 5 show top plan views of battery assemblies 200 and 300 according to another exemplary embodiment of the present invention.

Referring to FIG. 4, in comparison to FIG. 2, the difference is that the magnets 271 and 272 are attached to the inside that faces the battery cells 211 and 213 on the outermost pressing plates 221 and 224.

Referring to FIG. 5, in comparison to FIG. 2, regarding the battery assembly 300, the drivers 361 and 362 in a pressing pole form are disposed to be connected to respective sides of the pressing plates 321 (including magnet 371 and the insulating film 381) and 324 (including magnet 372 and the insulating film 382) disposed on the outermost portion with respect to the horizontal direction of the moving direction of the battery cells 311, 312, and 313.

As the drivers 361 and 362 exist on the respective sides to perform pressing to the respective sides, all the pressing plates 321, 322, 323, and 324 may move in the direction (marked with arrows) that is parallel to the pressing direction while connected to the pressing frames (330:331 and 332). That is, when mechanical pressing is performed in the facing-each-other direction by the drivers 361 and 362, the pressing plates 321, 322, 323, and 324 move to the right and the left, and as shown in FIG. 5, the battery cells 311, 312, and 313 become a pressed and compact battery assembly 300.

Figure 6:
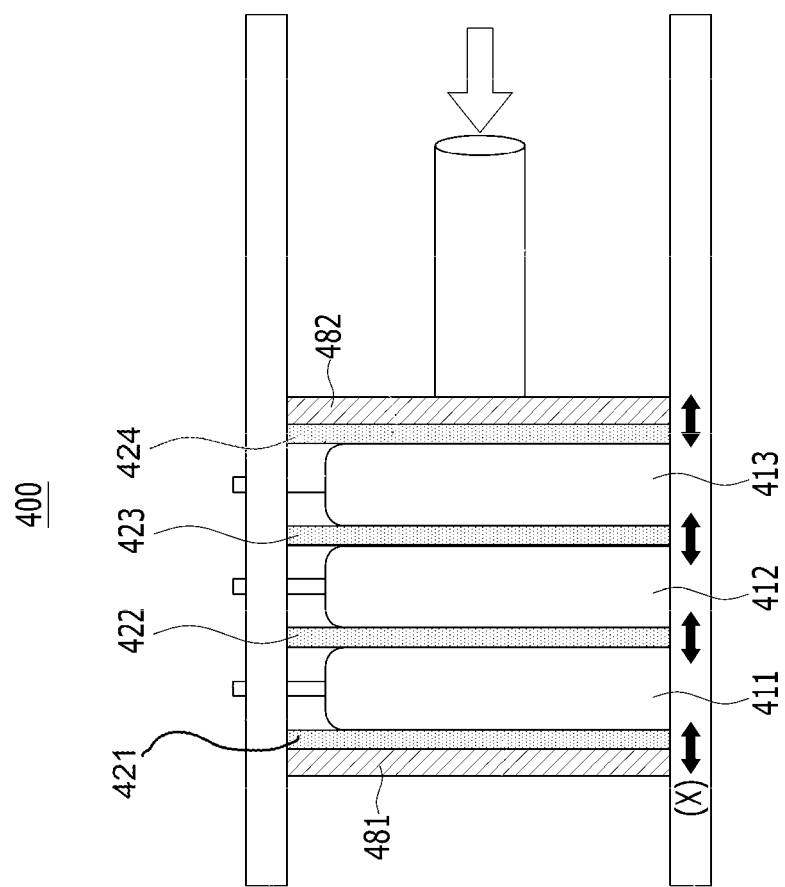
FIG. 6 shows a top plan view of a battery assembly showing that battery cells according to an exemplary embodiment of the present invention are pressed.
Figure 7:
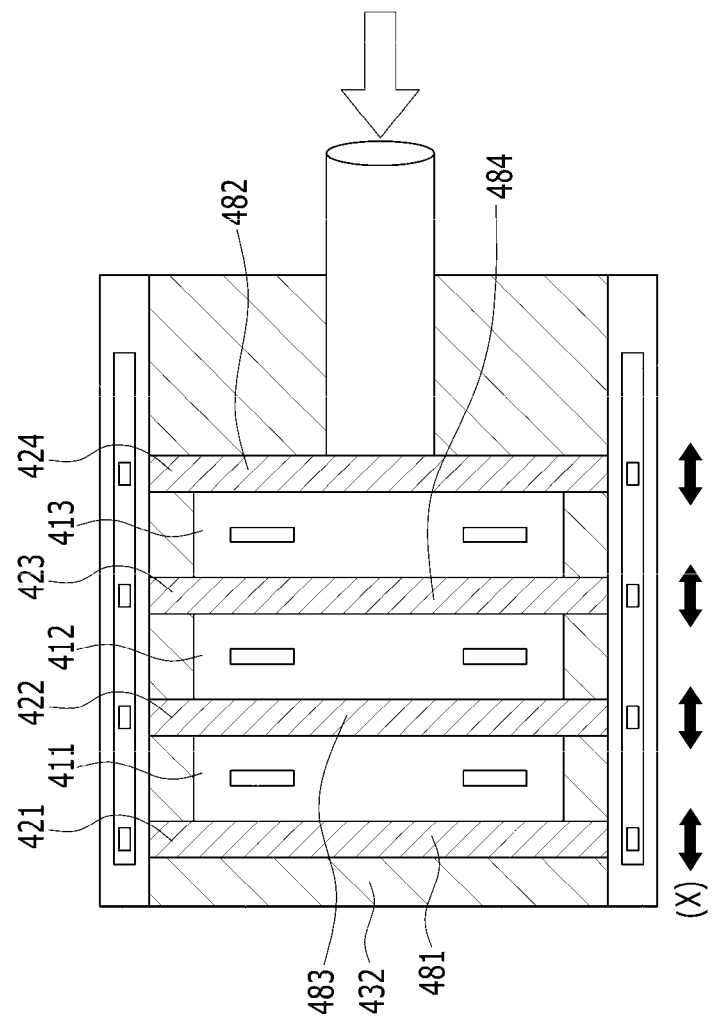
FIG. 7 shows a top view of a battery assembly of FIG. 6.

FIG. 6 and FIG. 7 show top plan views of battery assemblies 200 and 300 according to another exemplary embodiment of the present invention.

Referring to FIG. 6, in comparison to FIG. 2, pressing plates 421, 422, 423, and 424 are made of magnets, so the battery assembly 400 may increase the pressing force, and shielding films 481, 482 are respectively formed on the sides excluding the side that faces the battery cells 411, 412, and 413. Therefore, referring to FIG. 7, the pressing plates 421, 422, 423, and 424 are covered by the shielding films 481, 482, 483, and 484.

The present invention will now be described through examples, wherein the examples exemplify the present invention, and the scope of the present invention is not limited thereto.

In another way, the examples will confirm the effect of pressing by a magnet, so it is performed for one battery cell.

Preparation Example 82 wt % of $LiNi_{0.6}Co_{0.2}Mn_{0.2}O_2$ as a positive active material, 9 wt % of carbon black as a conductive material, and 9 wt % of PVdF as a binder are put into NMP, a solvent, and are mixed to manufacture a positive electrode slurry, which is then applied to a 20 μm-thick aluminum current collector to a thickness of 50 μm, and it is then dried at a temperature of 130° C. to thus manufacture a positive electrode.

A Li metal with a thickness of 50 μm is used as a negative electrode.

A stack cell of a positive electrode/negative electrode/positive electrode is manufactured in a form of providing respective sides of a porous polyethylene base, and an SRS separation film in which an organic/inorganic mixed layer in which a binder (PVdF) and an inorganic material particle ($Al_2O_3$) are mixed at a weight ratio of 2:8 between the positive electrode and the negative electrode, and an electrolyte solution in which 1 M of $LiPF_6$ is dissolved in a carbonate solvent of EC:EMC=1:2 is injected to manufacture a 2.1 A pouch-type battery cell.

Example 1

A battery assembly is prepared in a form as shown in FIG. 4 so as to perform pressing by installing three battery cells manufactured in the preparation example. Neodymium magnets with the magnetic force of 2000 gauss (controlling an area and a thickness) are attached to the pressing plates provided on the respective sides of the battery cell so that the opposite polarities may face each other.

A polyester fiber fabric panel (e.g., TORAY, TETORON) in a non-woven fabric form is prepared, the polyester fiber is dipped into a solution of copper sulfate ($CuSO_4$) including Cu as a superconductor, a formaldehyde is added as a reducing agent, and Cu is electrolessly plated and coated on the non-woven fabric to thus manufacture a shielding film.

The shielding film is attached to the pressing plates as shown in FIG. 4.

Further, mechanical pressing (pressing force: 0.80 MPa) is performed.

Example 2

Pressing on the battery cell is performed in a like manner of Example 1, except that neodymium magnets with a magnetic force of 3500 gauss are attached so that the opposite polarities may face each other as in Example 1.

Example 3

Pressing on the battery cell is performed in a like manner of Example 1, except that neodymium magnets with a magnetic force of 5000 gauss are attached so that the opposite polarities may face each other as in Example 1.

Example 4

In Example 4, pressing on the battery cell is performed in a like manner of Example 1, except that the pressing plates of the battery assembly are made so that the opposite polarities of the neodymium magnets with a magnetic force of 3500 gauss may face each other as shown in FIG. 6.

Comparative Example 1

The battery cell manufactured in the preparation example is prepared to prepare the battery assembly as shown in FIG. 4 (one battery cell is installed), no magnet is attached, and no additional mechanical pressing is performed.

Comparative Example 2

In Example 1, the magnet is not attached, and mechanical pressing (pressing force: 2.00 MPa) on the battery cell is performed.

Experimental Example 1

The battery cell of the battery assembly according to Examples 1 to 4 and Comparative Examples 1 and 2 is charged to 4.25 V/50 mA at 0.2 C in a constant current/constant voltage (CC/CV) condition at 25° C., and it is discharged to 3 V at 0.5 C in a constant current (CC) condition, which is defined to be 1 cycle, and a thickness of one battery cell at the 50-th cycle, and capacity retention (($50^{th}$ capacity/$1^{st}$ capacity)×100) at that time, are expressed in Table 1.

TABLE 1

|  | Total pressing force (MPa) | Cell thickness (mm, 1 cycle) | Capacity retention (%, 50-th cycle) |
|---|---|---|---|
| Example 1 | 2.0 | 7.5 | 90 |
| Example 2 | 2.5 | 7.1 | 94 |
| Example 3 | 3.0 | 6.8 | 97 |
| Example 4 | 5.0 | 4.0 | 99 |
| Comparative Example 1 | 0 | 21 | 60 |
| Comparative Example 2 | 2.0 | 12 | 79 |

Total pressing force represents a summation of the pressing force by the gauss measured by a gauss meter and the mechanical pressing force.

Referring to Table 1, it is found that, as the magnet has higher gauss, the pressing force increases, and as the pressing force increases, the lifespan characteristic is improved.

Further, when Comparative Example 2 is compared to Example 1, it is found that the total operated pressing force is the same but the lifespan characteristic of Example 1 having performed pressing by the magnet is more excellent and an increase of the thickness of the cell is less. By this, it is found that when the pressing by the magnet is added, more uniform pressing is performed, differing from mechanical pressure alone.

Those of ordinary skill in the art to which the present invention belongs will be able to make various applications and modifications within the scope of the present invention.

INDUSTRIAL APPLICABILITY

The battery assembly according to the present invention may include not only mechanical pressing but also magnetic pressing to the battery cells by including magnets, thereby further increasing the pressing force to the battery cells, and improving the performance of a battery by providing uniform pressing.

Further, the battery assembly according to the present invention includes a shielding film for shielding magnetism so as to not influence other components of the device including the same, and also acquire safety.

The invention claimed is:

1. A battery assembly for pressurizing a plurality of battery cells, comprising:
   the plurality of battery cells;
   a presser including a plurality of pressing plates provided on both sides of each of the plurality of battery cells, and separating each of the plurality of battery cells, and pressing on the plurality of battery cells, and pressing frames that connect with an upper portion and a lower portion of each of the pressing plates; and
   a driver for moving the presser so as to press the plurality of battery cells to the pressing plates,
   an outermost pair of the pressing plates, wherein each of the outermost pair of the pressing plates has a magnet disposed on an inner surface thereof,
   wherein a pair of magnets are disposed on both sides of the pressing plates except the outermost pair of the pressing plates such that opposite polarities of the magnets directly face each other, and
   a pair of shielding films, wherein a shielding film is disposed on a respective outermost pressing plate on a side exposed to an outside of the battery assembly,
   all the pressing plates or all the pressing plates excluding one of the outermost pair of the pressing plates are movable in a horizontal pressing direction, and the pressing plates connect to the pressing frames while moving in the horizontal pressing direction, and
   the battery assembly simultaneously performs mechanical pressing according to a movement of the presser by the driver and a magnetic pressing force produced by the magnets with opposite polarities facing each other, and
   the magnetic pressing force is 2000 gauss or more and 5000 gauss or less determined by a gauss of the magnets disposed on each of the outermost pair of the pressing plates, and
   wherein an area that a magnetic-field influences is equal to or greater than an area of the plurality of battery cells so as to eliminate deviation of the magnetic pressing force inside the plurality of battery cells when applying the magnetic pressing force to the plurality of battery cells.

2. The battery assembly of claim 1, wherein the magnets disposed on the inner surfaces of the outmost pair of the pressing plate have opposite polarities.

* * * * *